United States Patent
Zeng et al.

(10) Patent No.: US 8,717,702 B2
(45) Date of Patent: May 6, 2014

(54) MEASUREMENT OF SPACING FLUCTUATION

(75) Inventors: Qinghua Zeng, Freemont, CA (US); Ellis Cha, San Ramon, CA (US); Soramany Ka, San Jose, CA (US)

(73) Assignees: SAE Magnetics (HK) Ltd., Shatin, N.T. (HK); Headway Technologies, Inc., Milpitas, CA (US)

( * ) Notice: Subject to any disclaimer, the term of this patent is extended or adjusted under 35 U.S.C. 154(b) by 92 days.

(21) Appl. No.: 13/424,617

(22) Filed: Mar. 20, 2012

(65) Prior Publication Data

US 2013/0250455 A1    Sep. 26, 2013

(51) Int. Cl.
G11B 21/02    (2006.01)

(52) U.S. Cl.
USPC ............................................................ 360/75

(58) Field of Classification Search
None
See application file for complete search history.

(56) References Cited

U.S. PATENT DOCUMENTS

| | | | |
|---|---|---|---|
| 5,517,376 A | 5/1996 | Green | |
| 6,968,731 B2 | 11/2005 | Hu et al. | |
| 7,623,314 B2 * | 11/2009 | Yamashita et al. | 360/75 |
| 7,969,685 B2 | 6/2011 | Shen et al. | |
| 7,974,039 B1 | 7/2011 | Xu et al. | |
| 8,116,037 B2 | 2/2012 | Kohira et al. | |
| 2008/0100951 A1 * | 5/2008 | Takahashi | 360/75 |
| 2008/0204923 A1 * | 8/2008 | Yoon | 360/75 |
| 2008/0247073 A1 * | 10/2008 | Park | 360/59 |
| 2008/0266704 A1 * | 10/2008 | Kim et al. | 360/75 |
| 2009/0086367 A1 * | 4/2009 | Taniguchi et al. | 360/97.02 |
| 2009/0122444 A1 | 5/2009 | Ma et al. | |
| 2010/0073795 A1 * | 3/2010 | Amano | 360/31 |
| 2010/0142080 A1 * | 6/2010 | Deng et al. | 360/75 |

OTHER PUBLICATIONS

Co-pending U.S. Appl. No. 13/317,402, filed Oct. 17, 2011, "Head DFH Protrusion Shape Calibration by HDI Sensor," Siu Yin Ngan, et al., 33 pgs.
Co-pending U.S. Appl. No. 13/424,640, filed Mar. 20, 2012, "Spacing Fluctuation Compensation," Qinghua Zeng, et al., 27 pgs.

* cited by examiner

*Primary Examiner* — Peter Vincent Agustin
(74) *Attorney, Agent, or Firm* — Saile Ackerman LLC; Stephen B. Ackerman

(57) ABSTRACT

A method for determining the surface distortions of a disk in a spin-stand or single or multiple disk hard disk drive (HDD) utilizing a DFH type write head. A stepwise power curve is supplied to the DFH head, the head is flown over a chosen track on the disk, and the high frequency signal from a HDI sensor is analyzed in order to determine the step of an initial touchdown power and the step of a complete touchdown power as a function of individual sectors in a sector subdivision along a chosen track. The HDI sensor signal is averaged within each step of the power curve between these two steps and a Ratio variable, Ratio=(Max. amplitude)/(RMS amplitude)

is calculated for each step and is averaged over each rotation of the disk during the step.

22 Claims, 8 Drawing Sheets

MEASUREMENT OF SPACING FLUCTUATION

RELATED PATENT APPLICATION

This application is related to Ser. No. 13/317,402 filing date Oct. 17, 2011 and to Ser. No. 13/424,640 filing date Mar. 20, 2012, both assigned to the same assignee as the current application.

TECHNICAL FIELD

This disclosure relates to the fabrication of hard disk drives (HDD), particularly to a method of measuring fluctuations in spacing between a head and a disk.

BACKGROUND

As magnetic read/write heads have been required to deal with magnetic media having increasingly higher area density of recorded information, various methods have been developed to improve the capabilities of the head to read and write at those levels. Traditionally, the direction taken in trying to achieve the reading and writing of this high density information has been to decrease the spacing (i.e. the static fly height) between the disk and the slider in each new generation of products.

Figure 1:
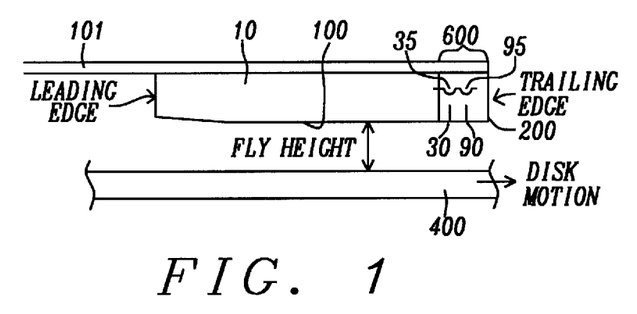
FIG. 1 is a schematic drawing illustrating a DFH-type slider-mounted read/write head positioned over a rotating disk.

FIG. 1 is a schematic illustration showing a single suspension-mounted slider (the combination collectively termed a "head gimbals assembly (HGA)") positioned above a spindle-mounted, rapidly rotating magnetic hard disk during disk-drive operation in a hard disk drive, HDD, (or a spin-stand) at ambient operating temperature. The suspension (101) holds the slider (10) at an angle above the surface of the spindle-mounted magnetic disk (400), producing a "fly height" (clearance) between the air bearing surface (ABS) (100) of the slider and the disk. A read/write head (600) is mounted within the slider. The rotation of the disk (400) is, by definition, into the leading edge of the slider, while the read/write head (600) is located at the trailing edge of the slider. The write-gap (30) (which the write magnetic field spans and contacts the disk) of the head (90) is "above" (i.e. to the trailing edge side of) the read-gap portion (30). The hydrodynamics of the air layer between the ABS and the rotating disk surface supports the slider at its fly height above the disk. In a dynamic flying height (DFH) type of system to be considered herein, a controllable heater element (35), is located adjacent to the write gap (90) and, by heating the region surrounding the gap, can cause protrusions (not shown) of the ABS (200) of the head portion relative to the undisturbed shape of the ABS when it is not heated. These protrusions will produce a characteristic shape (the protrusion profile) across the ABS, which will manifest itself in variations of the flying height of the ABS above the disk. It is to be noted that modern HDD systems contain multiple disks and multiple read/write heads that are aligned with each of the multiple disks. Therefore, the method to be discussed herein may be discussed in terms of a single disk and its head, but the method is in no way limited to a single head/disk combination and it may, by extension, be applied to a multiplicity of disks and their associated heads. Similarly, the steps required to implement the method as discussed herein are easily implemented in a single head/disk combination or, independently, in a multiple head/disk combination. Finally, all steps required to implement the method can be implemented in hardware or firmware incorporated within the HDD, the spin stand or the multiple disk HDD.

Consistent and rapid increase in the recording area density of hard disk drives requires a corresponding continuous decrease in the flying height of the slider or mechanical spacing between magnetic recording head and disk. After the FH was reduced to about 10 nm, further decrease in FH became extremely difficult. Now that the thermal expansion based technique of DFH has emerged, dynamic control of the flying height during disk rotation has become possible. This technology has been widely applied in the past several years. As the recording density approaches 150 Gbit/cm2 (1 Tbit/in2), the spacing must now be decreased to a range of 1 nm.

In order to reliably control the spacing through activation of the heater, it is necessary to have a feasible way of measuring the spacing while applying the power to the heater. Relative spacing change can be calculated based on the well-known Wallace equation that relates signal loss to spacing as a function of frequency. However, to determine the actual spacing, a reference point is needed. The reference point is usually taken as the point where the head touches the disk. It is defined as the zero of the spacing. The process of finding this reference point is called touch down (TD) detection. For better TD detection and potential real time monitoring of head/disk spacing, the head element typically also includes a head-disk interference (HDI) sensor (or, HDIs). This sensor is a resistive temperature sensor used to detect a temperature change in the head that is induced by changes in clearance during head vibrations or by a direct contact caused by contacting with disk asperities. Note that different sensor types exist, including PZT and LDV sensors. The HDIs signal (from whatever type sensor being utilized) has DC (low frequency) and AC (high frequency) components. When the slider flies at a low clearance, low frequency oscillation (the DC component) appears. When the slider contacts the disk and afterwards, a strong high frequency (the AC component) HDIs signal appears. Thus, the AC component of the HDIs signal is more sensitive to the slider/disk contact, and, therefore, it could be more effective for TD detection. After a reference point is found, a desired spacing can be set to a specified value, such as 1.5 nm for the current generation of drives, by adjusting the DFH power during reading and writing.

In the current generation of drives, where the whole disk is divided into 10 or 30 zones in a radial direction, the TD power and spacing at each zone should be a constant. In fact, the TD power and the spacing are not even constant along the same track. The spacing fluctuates because the disk within the disk drive does not present a perfectly flat surface. For example, the disk typically has an initial distortion from disk manufacturing. After the disk is assembled into the drive, additional distortions or imperfections can be induced. At an inner diameter (ID) region, due to forces applied in clamping the disk, the disk might have a large local distortion. At an outer diameter (OD) region, due to a poor alignment, the disk might have a tilting relative to the disk rotational axis. Both the force-induced distortion of the disk and its tilting due to misalignment will induce a spacing fluctuation at the same track. The fluctuation amplitude ([max spacing-min spacing], during one revolution at the same track) is dependent on the disk condition (distortion/tilting) and the slider air bearing surface design. The amplitude could range between 0.5 nm and 2 nm. When the spacing approaches the 1 nm range, this fluctuation becomes very significant. At the minimum spacing position, the slider might actually contact the disk, which causes a system failure if the contact occurs during a writing process. At the maximum spacing position, the total spacing is too large, and it can cause a "weak write" failure due to a large magnetic spacing and a magnetic field that is insufficient at the disk to create a proper magnetic transition. For these reasons, the spacing fluctuation needs to be under control or compensated which, in turn, requires an accurate method of measuring the spacing and its fluctuations.

SUMMARY

A first object of the present disclosure is to provide a quick, accurate and cost-effective method of measuring spacing fluctuations between a DFH type read/write head and a rotating disk surface in either a hard disk drive or a test spin-stand.

A second object of the present disclosure is to measure the spacing fluctuations using the signal generated by the head-mounted HDI sensor, which is a device already present in the slider.

A third object of the present disclosure is to provide a method of evaluating disk distortions and misalignments during disk-drive manufacturing.

A fourth object of the present disclosure is to provide a method of evaluating disk problems in a HDD as part of regular maintenance procedures.

A fifth object of the present disclosure is to provide a method of evaluating quality control of disks and disk drives.

A sixth object of the present disclosure is to apply the method to single or multiple disk drives and single or multiple head and slider configurations.

A seventh object of the present disclosure is to apply the method using hardware or firmware incorporated within the HDD or spin stands so that self-examination for maintenance purposes may be carried out in an automated manner and at chosen intervals.

The objects of this disclosure will be achieved by use of heat producing elements in a DFH-type slider mounted read/write head to provide systematic clearance variations between the head and disk surface during disk rotations, in conjunction with the use of an HDI sensor, also mounted within the slider, that can provide a response signal to indicate when and where touchdowns (TD) occur during those variations. The processing and analysis of these signals give quantitative and qualitative evidence of the condition of the disk.

Currently, the TD detection in a HDD is track based. At each track a TD power value is determined based on a selected TD detection criterion/method, eg. one track-one TD power value. The technique to be provided herein has an increased resolution because the TD power is determined on a sector-by-sector basis rather than a single track basis. Since there are typically 200 sectors per track (Ns=200), there can be that number of TD power values. When properly analyzed, the sector-by-sector TD data can provide more useful information, such as spacing fluctuations and disk condition.

Figure 2A:
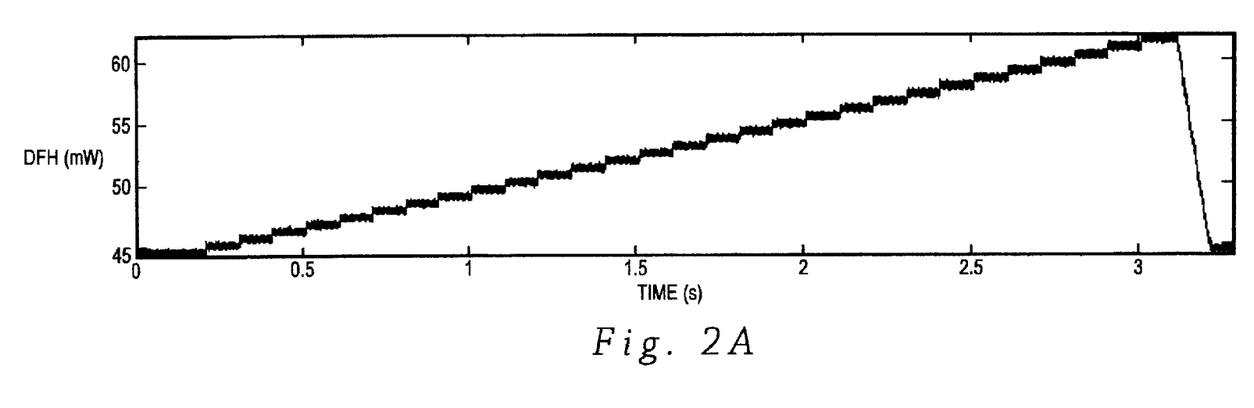
FIG. 2a and FIG. 2b are graphical illustrations showing, in 2a, a stair-shaped regularly incremented DFH heater power pulse and, in 2b, the response by a HDI sensor to that pulse.
Figure 2B:
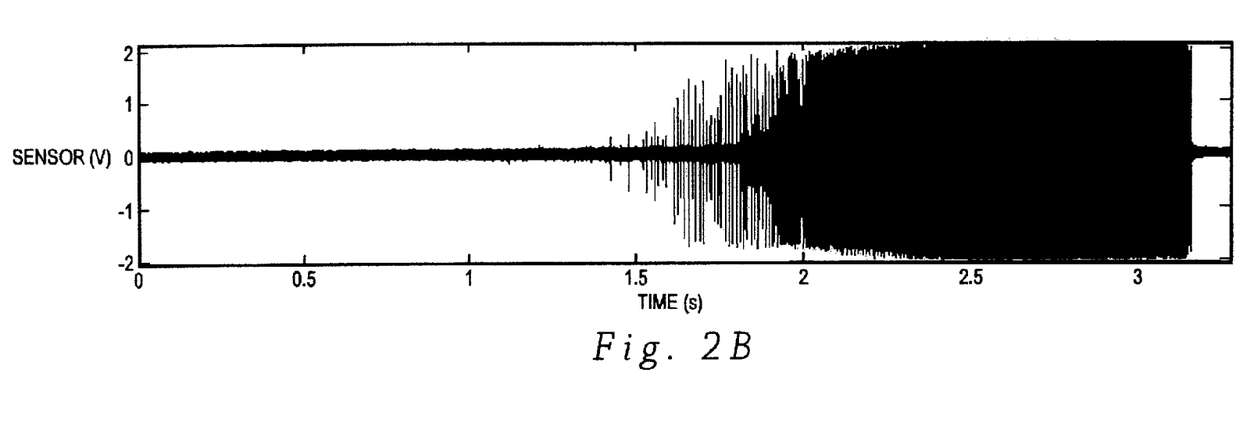

Referring to FIGS. 2a and 2b, there is shown an example of the application of the method. To create these figures, a disk was mounted on a spin-stand and the disk was rotated at 5400 rpm. A DFH-type slider was flown over the disk at an ID, and a "stair-like" regularly incremented DHF power pulse (as shown FIG. 2a) was applied to the slider.

Referring to FIG. 2b, there is shown the captured HDIs signal that was generated in response to this pulse. Each step of the DHF power pulse of FIG. 2a is about 0.1 second in duration with a small DFH power incremental, approximately 0.5 mW. Within each of the power steps, there are about 9 revolutions of the disk.

For the first 1.4 seconds, the amplitude of sensor signal is very small (at a low DHF power). The signal indicates that there is no slider disk contact. As the power increases to about 52 mW, small spikes begin to appear. This indicates that the slider contacts the disk intermittently, or the slider contacts some local spots on the disk at this power level. This is the first TD.

Figure 3A:
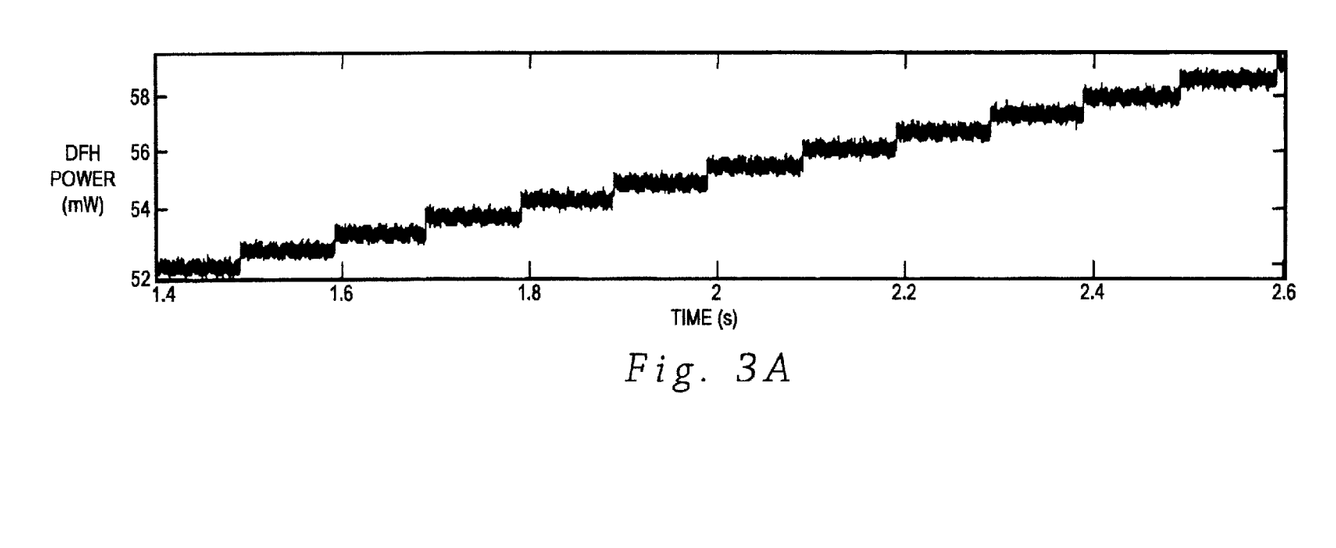
FIG. 3a and FIG. 3b are more detailed extensions of FIGS. 2a and 2b, showing the response of the HDI sensor as full touchdown is achieved.
Figure 3B:
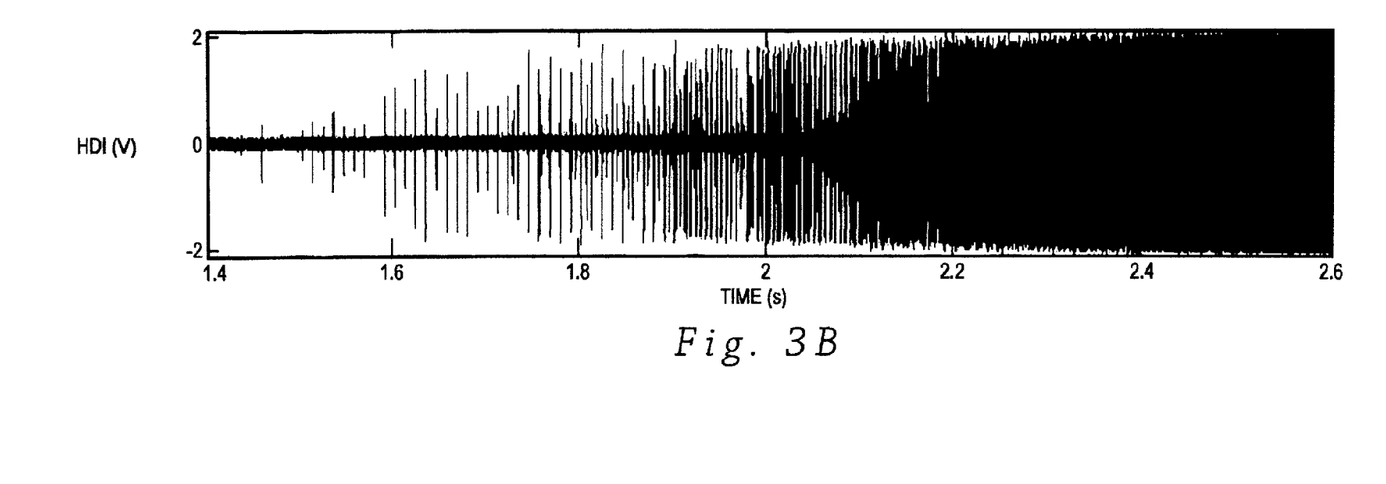

Referring next to FIGS. 3a and 3b, there is shown the details of the previous example, beginning at 1.4 seconds, when the first spikes began to appear in FIG. 2b. When the power increases further, stronger spikes appear, indicating the onset of more severe interference between the slider and the disk at same spots, and then even more spikes appear as the slider contacts still more spots.

When the DFH power is about 58 mW (at about 2.5 seconds), individual spikes can no longer be differentiated and the sensor signal appears continuous at its full height. This means that the slider is now contacting the disk all locations on the track. This is the full TD.

It is to be noted that the method of the present disclosure can be implemented using devices incorporated into each disk drive or spin platter so that self examination for maintenance purposes are easily carried out.

From this point on, we will explain how more sophisticated processing of HDIs signals, coupled with the use of differently shaped power input signals, can produce the desired spacing fluctuation information that was the object of the disclosure.

BRIEF DESCRIPTION OF THE DRAWINGS

The objects, features, and advantages of the present disclosure are understood within the context of the Detailed Description as set forth below. The Detailed Description is understood within the context of the accompanying figures, wherein.

Ratio=(Max. amplitude)/(RMS value), plotted vs. the DHF power.

DETAILED DESCRIPTION

The present disclosure teaches a method of measuring the spacing and fluctuations in spacing between a DFH slider-mounted read/write head and a disk or platter surface utilizing the HDI sensor signal produced under various conditions of power input to the DFH heater.

We have already shown in FIGS. 2 and 3 how a specially designed power input waveform to the DFH slider can produce corresponding signals from the HDI sensor showing the onset (at low power) of touchdowns as discrete spikes, followed by a total touchdown (at high power) as a continuous signal at maximum amplitude within which the discrete touchdown events can no longer be differentiated. It will now be shown how a more sophisticated analysis and processing of the HDI signal can provide sufficient information to meet the objects of the disclosure as described above.

At each of the power steps described in FIGS. 2 and 3, the RMS (root-mean-square) value of the HGI sensor signal during the time duration of the power step was calculated and its maximum amplitude (Max. amplitude) was found. Then, ratio values, "Ratio", were defined and calculated as:

Ratio=(Max. amplitude)/(RMS value)

Figure 4:
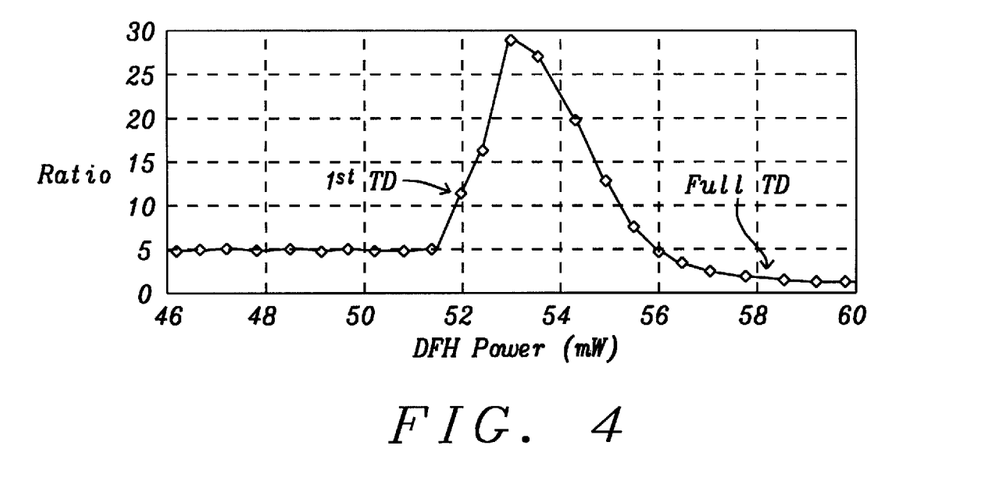
FIG. 4 is a graphical illustration of the relationship between a defined variable, "Ratio", which is the ratio of the maximum amplitude of the HDI sensor signal to its RMS value.

FIG. 4 show the graphical plot of Ratio (as defined above) vs. the DHF power supplied, in milliwatts (mW). Using this graph, we can clearly identify the first TD point ($1^{st}$ TD) and full TD point. These correspond to the first discrete spike of FIG. 2b and the point where the HDI signal becomes continuous. The power difference between the first TD (approx. 52 mW) and the full TD (approx. 58 mW) is the TD power fluctuation range of the tested disk track.

Typically, through use of the Wallace equation, one knows the DHF power efficiency, i.e. the spacing change in nanometers per milliwatt of power (mW), such as 0.13 nm/mW. Then, the spacing fluctuation range can be obtained. In this case, the TD power fluctuation is about 6 mW (58 mW-52 mW), so the spacing fluctuation is: 0.13 nm/mW×6 mW, or about 0.8 nm.

With even more sophisticated processing of the signal, additional information about the spacing fluctuation profile can be obtained. To this end, at each power step, the signal was divided into the number of revolutions made by the disk during that power step: eg., 9 revolutions for the 0.1 sec power step. The elapsed time for each revolution, Tr, is approximately: Tr=11.11 ms, for 5400 rpm rotation rate of the disk.

Next, each revolution was sub-divided into Ns sectors, Ns=200 sectors in this instance. Within each sector, the ratio was calculated, so each revolution will have Ns ratio values corresponding to the Ns sectors. Averaging all ratio values over the 9 revolutions gave an averaged Ns ratio values for each power steps. Plotting all the ratio values for each of the power steps in a single chart, produces a contour plot, as shown FIG. 5.

Figure 5:
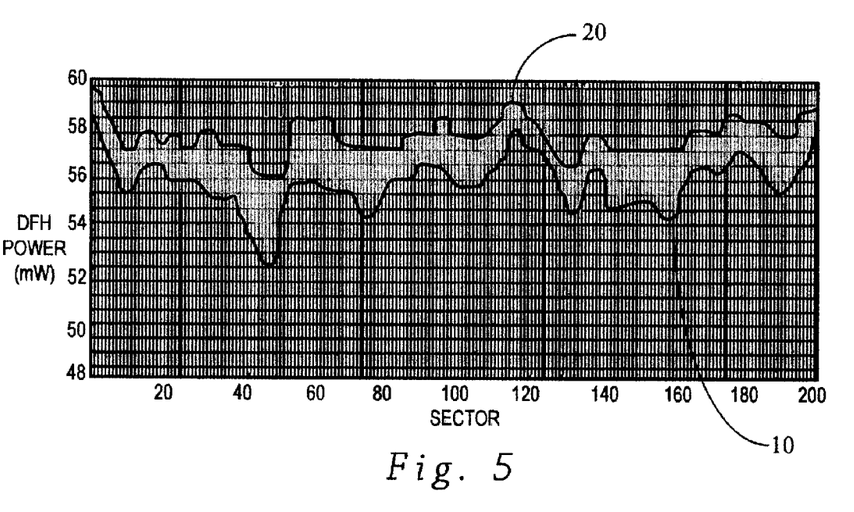
FIG. 5 is a graphical illustration of a TD power profile at an inside diameter (ID) track, which is a plot of DFH power supplied to the slider vs. average sector Ratio, where the Ratio is now calculated as an average for each of 200 track sectors during the 9 revolutions of the disk that occur during a 0.1 second power step shown in FIG. 2.

Referring to FIG. 5, there is shown three portions in the graph, a middle portion outlined by upper (20) and lower (10) curves. The lower portion of the graph, labeled (10), indicating lower values of the ratio, shows the graphed averages before the first TD occurs at an inner diameter (ID) of the disk. The middle portion of the graph, between (10) and (20), indicates a region of higher values of the ratio after the onset of the first TD at each of the sectors. The upper portion of the graph, labeled (20), also indicating lower values of the ratio, shows the graphed averages after the full TD occurs. From this figure, we can visualize not only the TD fluctuation range, but also the TD power profile. The power profile should be a direct indication of the disk distortion profile.

Figure 6A:
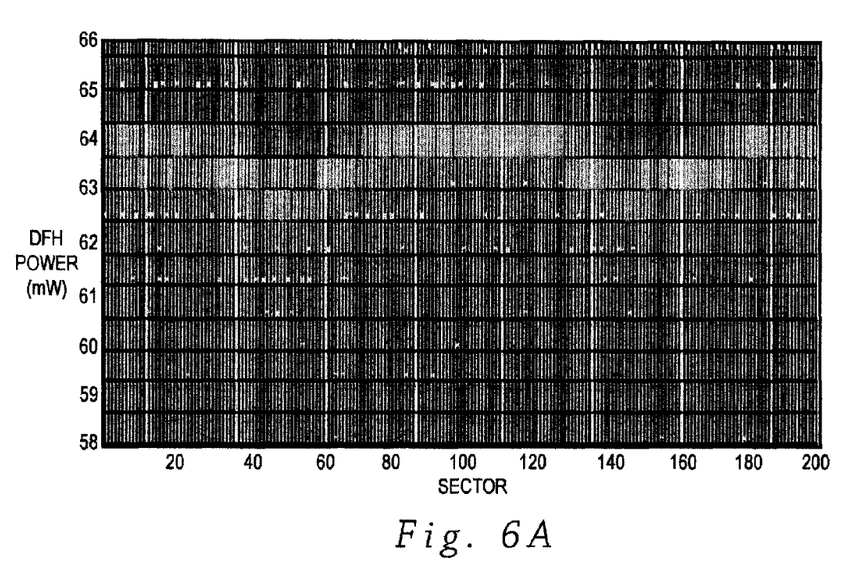
FIG. 6a and FIG. 6b are graphical illustrations of the TD power profile (as in FIG. 5) plotted at the middle diameter (MD) of the disk (FIG. 6a) and at the outside diameter (OD) of the disk (FIG. 6b)
Figure 6B:
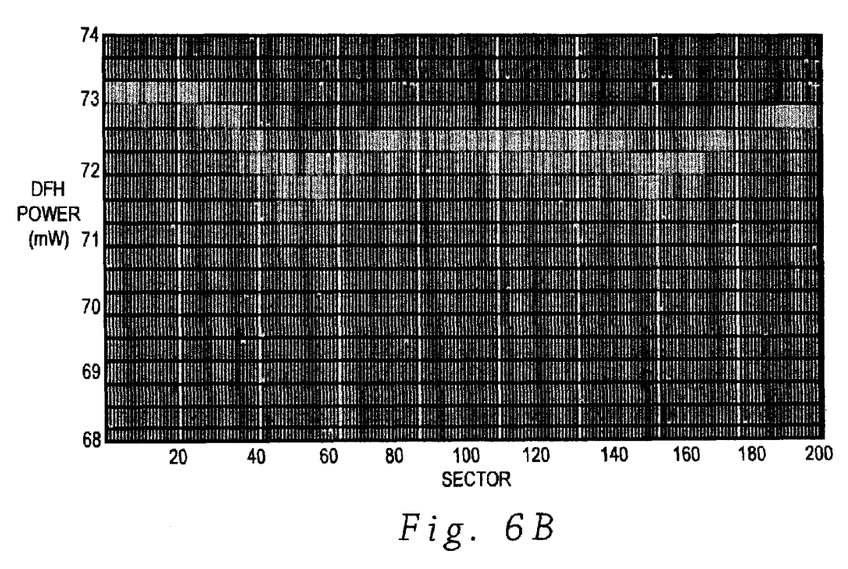
Figure 6C:
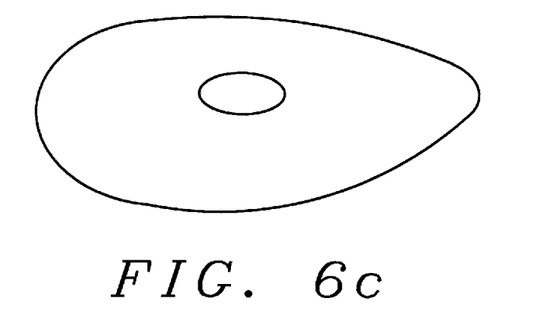
FIG. 6c is a schematic illustration of a "potato chip" type of distortion measured in FIG. 6b.

Referring next to FIGS. 6a and 6b, there is shown the TD profile as in (20) of FIG. 5, but evaluated at the middle diameter of the disk, MD, in FIG. 6a and the outside diameter of the disk, OD, in FIG. 6b. The fluctuation at MD is much smaller than ones at ID (FIG. 5) and OD. Surprisingly, we can see the "twice-around" fluctuation profile at OD that is due to the kind of disk distortion effect that is pictorially illustrated in FIG. 6c.

Figure 7:
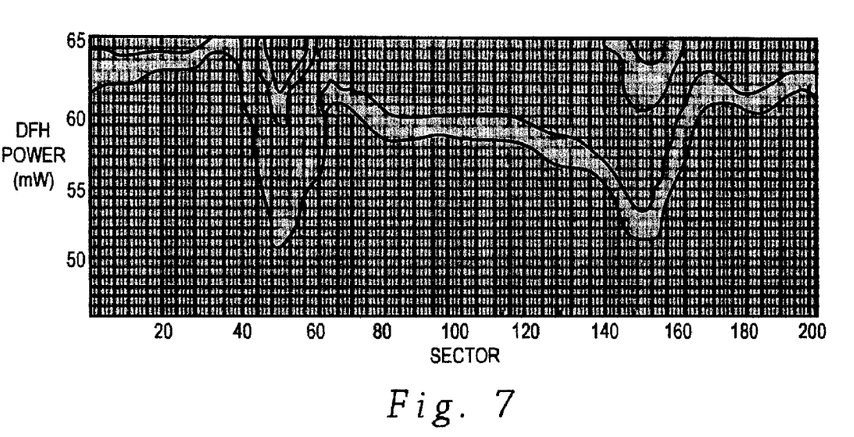
FIG. 7 is a graphical illustration of a TD power profile for a poorly clamped disk, showing the effect of the poor clamping on the clearance fluctuations and, conversely, indicating how clearance fluctuations can be used to determine a poorly clamped disk.

Relatively speaking, this disk is in a very good condition (good clamping). If the clamping is not good, the fluctuation can be much larger. Referring to FIG. 7, there is shown the same DFH slider flying over a poorly clamped disk. Its fluctuation is much larger than the previous case in which there was a good disk, well clamped.

At ID of the disk in FIG. 7, the spacing fluctuation is about 2.0 nm. Such a large fluctuation can cause failures. For example, if the back off spacing is set to be 1.5 nm based on the first TD, then the resulting spacing at a high spacing spot (or sector) will be 3.5 nm, possibly leading to a weak write failure due to a magnetic spacing that is too large. If the back off spacing is set to be 1.5 nm based on the TD occurring on the full track (or on all sectors), then the spacing at a low spacing spot (or sectors) will be −0.5 nm, leading to contacts between the slider and the disk that will cause a bad write failure. Therefore, a technique is needed that can identify this kind of poor disk, reject it or re-work/re-assemble it. The technique described below is the best one.

Figure 8A:
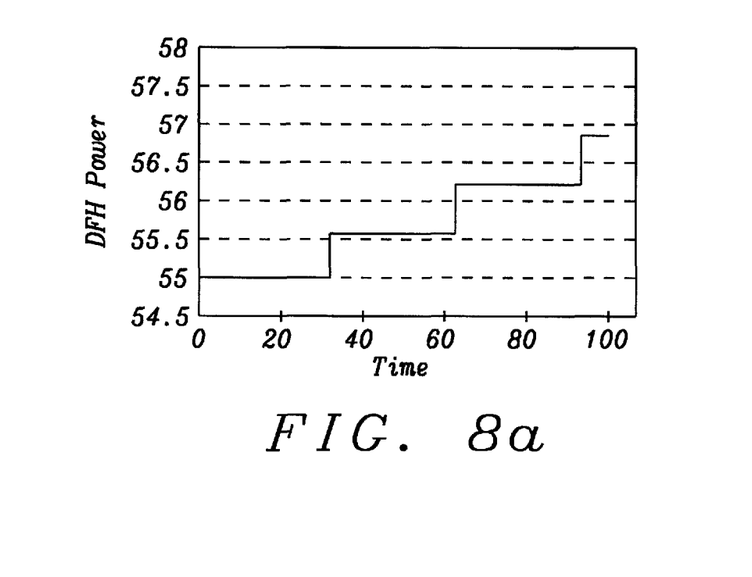
FIG. 8a and FIG. 8b are schematic graphical illustrations showing two different types of DFH power pulse shapes that can be used to evaluate clearance fluctuations.

Referring now to FIG. 8a there is shown, schematically, a DFH power pulse like that previously illustrated in FIG. 2a. This rather simple step-wise shape provides an advantageous method to characterize the surface properties of a disk by deducing the spacing fluctuations between the slider and the disk surface as has been described above. One can use more complicated pulses to produce the same or better fluctuation profile measurements.

Figure 8B:
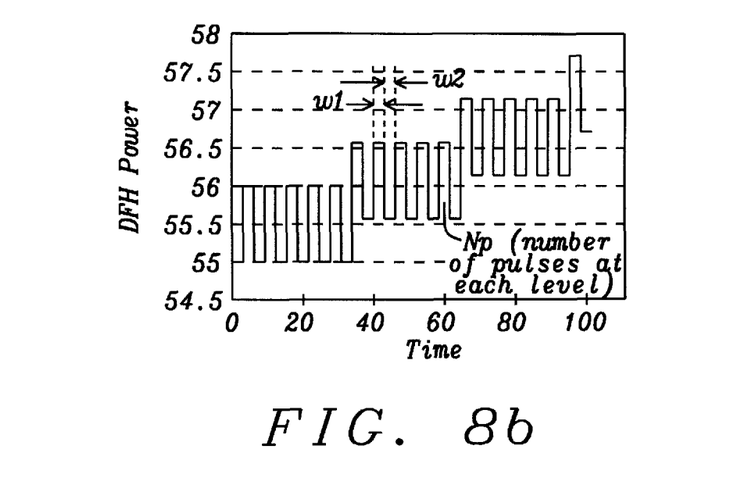

FIG. 8b shows, schematically, an example of a more complicated power pulse shape. At each power step of FIG. 8b, there are Np small pulses of equal height, each of width w1 and spacing w2. By selecting different values of w1 and w2, different overall pulse shapes can be achieved. Two exemplary options are discussed below.

Option1: w1=Tr/Ns, w2=w1; Np=Nr/2, applying the $1^{st}$ pulse with 0 delay related to the spindle index (the electrical signal from a spindle control circuit), capturing the $1^{st}$ HDIs signal trace; then applying the $2^{nd}$ pulse with w1 delay related to the spindle index, capturing the $2^{nd}$ HDIs signal trace. Processing these two traces, we can obtain the full TD power profile.

Option2: w1=Tr/Ns, w2=w1*3; Np=Nr/4, applying the $1^{st}$ pulse with 0 delay related to the spindle index, capturing the $1^{st}$ HDIs signal trace; then applying the $2^{nd}$ pulse with 1*w1 delay related to the spindle index, capturing the $2^{nd}$ HDIs signal trace . . . , applying the $4^{th}$ pulse with 3*w1 delay and capturing the $4^{th}$ trace. Processing these four traces, we can obtain the full TD power profile.

If the slider vibration that occurs after disk contact is strong, using the procedures of Option 1 or Option 2 can produce better measurement results with a penalty of a longer measurement time.

As is understood by a person skilled in the art, the preferred embodiment of the present disclosure is illustrative of the present disclosure rather than being limiting of the present disclosure. Revisions and modifications may be made to methods, processes, materials, structures, and dimensions through which spacing fluctuations between a DFH-type read/write head and a hard disk surface can be measured by a HDI sensor, while still providing such methods, processes, materials, structures and dimensions in accord with the present disclosure as defined by the appended claims.

What is claimed is:

1. A method for measuring spacing fluctuations between a dynamic flying height (DFH) controlled read/write head and the surface of a rotating disk comprising:

providing a hard disk drive (HDD) or spin stand having a rotatable disk mounted therein;

providing the DFH controlled read/write head having at least a heater element and a HDI sensor or its equivalent mounted therein, wherein said read/write head is flyable above said rotating disk; then, while rotating said disk, flying said read/write head over a selected track on said disk; and supplying power to said at least said heater element, stepwise, at a variable and controllable rate and time; and analyzing a high frequency component of a signal generated by said HDI sensor or its equivalent; then processing said high frequency component to determine a minimum power level step at which a detectable touchdown first occurs and a maximum power level step at which a full touchdown occurs; and then determining a touchdown power profile of said track by averaging a Ratio value over a total number of disk revolutions during each of said power steps between said minimum and said maximum and displaying said touchdown power profile in a single graph as a function of each of a sector subdivision of said track.

2. The method of claim 1 wherein said track is an inner diameter track and said touchdown power profile is an indication of disk distortion due to disk clamping.

3. The method of claim 1 wherein said track is a middle diameter track and said touchdown power profile is a general indication of disk surface distortions.

4. The method of claim 1 wherein said track is an outer diameter track and said touchdown power profile is an indication of tilting due to disk misalignment and disk surface distortions.

5. The method of claim 1 wherein said power is supplied to said DFH head along a stepwise increasing power curve, wherein each step of power is characterized by a constant value of the power for a fixed period of time, and wherein the power is incremented by a constant or a variable value to form the next step.

6. The method of claim 5 wherein said high frequency component of the response signal of said HDI sensor or its equivalent is analyzed during each of said power steps, between a minimum and a maximum, to produce a ratio variable for a step:

Ratio=(Max. amplitude)/(RMS amplitude), where (Max. amplitude) is the maximum HDI or equivalent signal amplitude measured during the power step and the (RMS amplitude) is the RMS value of the HDI or equivalent signal during the time duration of the step.

7. The method of claim 6 wherein said Ratio variable, for each said step, is averaged over the number of revolutions made by the disk during said time duration.

8. The method of claim 7 wherein said averaged Ratio variable is calculated for each of a number of sectors into which said track is uniformly divided and wherein said averaged Ratio, for each said step, as a function of sector number is then displayed graphically.

9. The method of claim 8 wherein said graphical display is illustrative of the disk surface topography along said selected track.

10. The method of claim 9 wherein said surface topography is an indication of disk warpage and general condition.

11. The method of claim 10 wherein the track location can be used to determine the physical causes of the disk distortion measured by the method.

12. The method of claim 5 wherein alternative step functions may be utilized when the behavior of the head at touchdown produces excessive vibrational modes in the HDI or equivalent sensor response.

13. The method of claim 1 wherein said HDI sensor or its equivalent can be any of a number of different types of sensors, including a PZT based sensor, or an LDV based sensor, or a PES signal from a servo-control mechanism, or a readback signal from drive firmware.

14. The method of claim 1 wherein said high frequency signal is an AC signal that is the remaining part of said signal generated by said HDI sensor or its equivalent when a DC component is removed.

15. The method of claim 14 wherein said high frequency signal of said HDI sensor or its equivalent is analyzed during each of said power steps, between a minimum and a maximum, to produce a ratio variable for a step:

Ratio=(Max. amplitude)/(RMS amplitude), where (Max. amplitude) is the maximum signal amplitude of said HDI sensor or its equivalent measured during the power step and the (RMS amplitude) is the RMS value of said signal during the time duration of the step.

16. The method of claim 14 wherein said HDI sensor or its equivalent can be any of a number of different types of sensors, including a PZT based sensor, or an LDV based sensor, or a PES signal from a servo-control mechanism, or a readback signal from drive firmware.

17. A hard disk drive (HDD) or spin stand capable of evaluating a disk condition comprising:

a HDD or spin stand having at least one rotatable disk mounted therein;

a DFH controlled read/write head associated with said at least one rotatable disk, wherein said read/write head is flyable above said rotating disk; and a HDI sensor or its equivalent capable of indicating touchdowns between said read/write head and said rotating disk by generating a high frequency signal at a head-disk contact;

a storage medium for storing signals;

a variable and controllable stepwise power input that is capable of being applied to said DFH controlled read/write head, wherein a power step produces a corresponding change in flying height of said read/write head and wherein a range of power steps produces a corresponding range of flying heights between a step that produces an onset of a touchdown and a step that produces a full touchdown; wherein a high frequency component of a signal generated by said HDI sensor or its equivalent determines a minimum power level step at which a touchdown first occurs and a maximum power level step at which a full touchdown occurs along a selected disk track and enables the creation and storage of a touchdown power profile between said levels as a function of a sector subdivision of said track, in said storage medium.

18. The HDD of claim 17 further including a display medium to display said touchdown power profile stored in said storage medium.

19. The HDD of claim 17 wherein said touchdown power profile is capable of being computed and stored for representative tracks on said disk, including tracks at an outer diameter, an inner diameter and a middle diameter.

20. The HDD of claim 19 wherein said touchdown power profile is capable of being used to determine disk distortions produced by poor clamping, misalignment or surface irregularities.

21. The HDD of claim 20 wherein said determinations are capable of being used to suggest the need for HDD service or maintenance.

22. The HDD of claim 17 wherein said high frequency signal is an AC signal that is the remaining part of said signal generated by said HDI sensor or its equivalent when a DC component is removed.

* * * * *

UNITED STATES PATENT AND TRADEMARK OFFICE
CERTIFICATE OF CORRECTION

PATENT NO. : 8,717,702 B2  
APPLICATION NO. : 13/424617  
DATED : May 6, 2014  
INVENTOR(S) : Qinghua Zeng et al.

Page 1 of 1

It is certified that error appears in the above-identified patent and that said Letters Patent is hereby corrected as shown below:

On the Title Page:

In the Assignees Item (73), delete first Assignee "SAE Magnetics (HK) Lid., Shatin, N.T. (HK)" and replace with -- SAE Magnetics (HK) Ltd., Shatin, N.T. (HK) --.

Signed and Sealed this
Twenty-second Day of July, 2014

Michelle K. Lee
*Deputy Director of the United States Patent and Trademark Office*